United States Patent [19]

Ivani

[11] 4,410,674
[45] Oct. 18, 1983

[54] SILICONE-VINYL ACETATE COMPOSITION FOR CONTACT LENSES

[76] Inventor: Edward J. Ivani, 2360-E. 74St., Brooklyn, N.Y. 11234

[21] Appl. No.: 322,266

[22] Filed: Nov. 17, 1981

[51] Int. Cl.$^3$ .................. C02C 7/04; C08F 218/08; C08F 230/08
[52] U.S. Cl. ........................ 526/279; 351/160 R; 351/160 H
[58] Field of Search .............. 526/279; 525/288

[56] References Cited

U.S. PATENT DOCUMENTS

| | | | |
|---|---|---|---|
| 3,228,741 | 1/1966 | Becker | 351/160 H |
| 3,808,178 | 4/1974 | Gaylord | 526/279 |
| 4,097,436 | 6/1978 | Buning et al. | 526/279 |
| 4,120,570 | 10/1978 | Gaylord | 526/279 |
| 4,139,513 | 2/1979 | Tanaka et al. | 526/279 |
| 4,139,692 | 2/1979 | Tanaka et al. | 526/279 |
| 4,216,303 | 8/1980 | Novicky | 526/279 |
| 4,246,389 | 1/1981 | LeBoeuf | 526/279 |
| 4,248,989 | 2/1981 | Novicky | 526/279 |
| 4,330,383 | 5/1982 | Ellis et al. | 526/279 |

*Primary Examiner*—Harry Wong
*Attorney, Agent, or Firm*—Abelman, Frayne & Rezac

[57] ABSTRACT

Contact lenses having increase oxygen permeability are fabricated at least in part from a copolymer of a vinyl siloxane and vinyl acetate.

8 Claims, No Drawings

SILICONE-VINYL ACETATE COMPOSITION FOR CONTACT LENSES

This invention relates to a novel water-insoluble gas-permeable material, capable of giving shaped articles excellent shapeability, surface wetting property and transparency, said articles being contact lenses.

In another aspect, the invention relates to methods of increasing the oxygen permeability of polymerized acetates.

In still other respects, the invention relates to oxygen-permeable, and to wettable contact lens materials. The copolymers can be cast, molded or machined to provide contact lenses.

The prior art teaches the use of many different polymers for contact lenses. However, although these polymers possess the optical clarity necessary for corrective lenses, they suffer from other characteristics which reduce their potential utility.

Polymethylmethacrylate is rigid and durable but relatively impermeable to oxygen. The hydrogel materials based on hydrophilic polymers such as polyhydroxyethylmethacrylate are soft and have poor durability. In addition, they provide an environment which favors bacterial growth and are relatively impermeable to oxygen.

Silicone rubber is soft and resilient and is highly permeable to oxygen. However, due to the low strength of polysiloxanes, a filler which increases the refractive index of the mixture, must be added to improve the durability. Further, the precision machining and polishing which is necessary in the fabrication of a corrective contact lens is extremely difficult with the elastomeric silicone rubbers. Copolymers of silicones and methyl methacrylate have been performed and although the material is permeable, the permeability is relatively low, of the order of 350 to 650 cc-mil/100 in$^2$/24 hrs/atm.

Accordingly, it would be highly desirable to provide a polymeric material suitable for use in fabricating contact lenses having increased oxygen permeability, improved mechanical strength, and which is sufficiently rigid to permit precision machining and polishing. I have now discovered novel copolymers, and multipolymers, materials which possess these properties.

The novel copolymers which I have discovered are prepared by copolymerizing a siloxane and an acetate. In particular a siloxane containing a double bond, and vinyl acetate. The double bond being preferable, but not nesessarily on one of the ends of the silicone chain.

The polysiloxanylalkyl ester monomers have a structural formula of the type

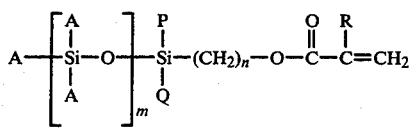

wherein P and Q are from the class consisting of $C_1$–$C_7$ alkyl groups, phenyl groups and Z groups; Z is a group consisting of

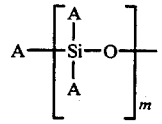

A is selected from the class consisting of $C_1$–$C_7$ alkyl groups and phenyl groups; R is selected form class consisting of methyl, ethyl, or butyl groups and hydrogen; m and n are integers less than 8.

The novel multi-polymers of the present invention comprise about 10–90 parts by weight of one or more of the siloxane monomers copolymerized with about 10–90 parts by weight of one or more acetate monomers, and in particular vinyl acetate.

The copolymers of the invention are prepared by contacting the mixture of comonomers with a free radical generating polymerization initiator of the type commonly used in polymerizing ethylenically unsaturated compounds. Representative free radical polymerization initiators include;

benzoyl peroxide
acetyl peroxide
lauroyl peroxide
decanoyl peroxide
tertiarybutyl peroxypivalate
azobisisobutyronitrile Conventional polymerization techniques can be employed to produce the novel copolymers and multipolymers. The comonomer mixture containing between about 0.05–2.5% by weight of the free radical initiator is heated to a temperature between 30° C. and 100° C., preferably below 70° C. to initiate and complete the polymerization. The polymerization can be carried out directly in a contact lens mold to form a lens; or the polymerization mixture can be heated in a suitable mold or container to form discs, rods or sheets which can then be machined to the desired shape using conventional equipment and procedures employed for fabricating lenses from polymethyl methacrylate materials. The temperature is preferably maintained below 55° C. in order to minimize the formation of bubbles in the copolymer. The copolymers thus produced may be extruded, pressed or molded into rods, sheets or other convenient shapes which are then machined to produce the contact lenses.

The novel copolymers have vastly increased oxygen permeability in comparison to conventional contact lens materials. For example, the oxygen permeability of polymethyl methacrylate is 34 cc-mil/100 in$^2$/24 hr/atm, and 13 for polyhydroxyethylmethacrylate.

While some of the copolymers are inherently wettable by human tears, it may be necessary to improve the wettability of others. This can be accomplished by several methods. For example, wettability can be imparted to the copolymer by the addition of from about 0.1% to about 10% by weight of one or more hydrophilic monomers to the copolymerization mixture. Such monomers include hydroxalkyl acrylates and methacrylates wherein the alkyl group contains 1 to 4 carbon atoms, acrylic and methacrylic acid, acrylamide, methacrylamide, N-methylolacrylamide, glycidyl acrylate and methacrylate, acrylonitrile, and N-vinyl-pyrrolidone.

The rigidity of the contact lenses prepared from materials useful in the practice of this invention may be varied by changing the ratio of comonomers and/or their chemical composition. Thus contact lenses prepared from vinyl acetate monomers are more flexible than those prepared from the combination of vinyl acetate methacrylate monomers as the copolymers with the siloxanes.

The rigidity of a contact lens prepared from the materials useful in the practice of this invention may be increased, if desired, by the incorporation into the copolymer composition of 0.01% to about 2% by weight of a crosslinking monomer such as a polyol dimethacrylate or diacrylate or a polyol acrylic ester of higher functionality, for example, ethylene glycol dimethacrylate, butylene glycol dimethacrylate, and neopentyl glycol diacrylate.

The particular silicone monomers used in this invention are: methacryloxypropyltri(trimethylsiloxy)silane; methacryl oxypropylpentamethyidisiloxane; methacryloxypropltris(pent amethyldisiloxaryl)silane; methyldi(trimethylsiloxy)silyl propylglycerol methacrylate; and bis(methacryloxybutyl)tetra methyldisiloxane.

EXAMPLE 1

This example illustrates the preparation of a representative oxygen-permeable copolymer.

A mixture of 35 parts of methacryloxyproyltris-trimethyl siloxysilane monomer, 65 parts of vinyl acetate and 0.04 parts of benzoyl peroxide by weight are mixed and placed in a 16×150 mm test tube. The test tube is sealed and placed in an oven and maintained at 45° C. for 20 hours, or until polymerized. The copolymer is hard, colorless, transparent and rigid. The oxygen permeability is 1200 cc-mil/100 in$^2$/24 hrs/atm.

The oxygen permeability of a disc of polymethylmethacrylate is 34 cc-mil/100 in$^2$/24 hrs/atm, while that of a disc of polyhydroxyethylmethacrylate is 13 cc-mil/100 in$^2$/24 hrs/atm. It is interesting that the permeability of a disiloxane monomer and methyl methacrylate in the same ratio 35/65 is only 500 cc-mil/100 in$^2$/24 hrs/atm. The gas permeability of the CAB lens is only 900 cc-mil/100 in$^2$/24 hrs/atm. The present copolymer is 2.4 times more oxygen permeable than the methacrylate silicone copolymer presently used in contact lenses.

EXAMPLE 2

A mixture of 35 parts by weight of the siloxane of Example 1 is mixed with 22 parts of vinyl acetate, and 43 parts of methyl methacrylate, 0.08 parts benzoyl peroxide. The mixture is agitated in a blender for about one minute, poured into a test tube, covered and placed in an oven at a temperature of 45°-50° C. for about 20 hours, or until polymerized. The material was manufactured into a contact lens and the gas permeability measured to be 1050 cc-mil/100 in$^2$/24 hrs/atm.

This copolymer is 110% more permeable than the siloxane methylmethacrylate polymer presently on the market. The vinyl acetate enhances and improves the permeability and wetting properties of the material.

Representative alkanol ester comonomers which may be employed in the practice of the invention include:
methyl acrylate and methacrylate
ethyl acrylate and methacrylate
propyl acrylate and methacrylate
isopropyl acrylate and methacrylate
butyl acrylate and methacrylate
amyl acrylate and methacrylate
hexyl acrylate and methacrylate
heptyl acrylate and methacrylate
octyl acrylate and methacrylate
2-ethylhexyl acrylate and methacrylate
nonyl acrylate and methacrylate
decyl acrylate and methacrylate
undecyl acrylate and methacrylate
lauryl, cetyl, and octadecyl acrylate and methacrylate.

The above monomers can be included in the copolymers to form the new composition of matter specially adapted for contact lenses having increased oxygen permeability, the composition should be about 20-70 parts by weight of an ester of a $C_1$-$C_{20}$ monohydric alkanol and an acid selected from the class consisting of acrylic and methacrylic acids.

The above polymers are manufactured into contact lenses by trimming the 16 mm diameter rod to normally 12.5 mm. The rod is cut in 5/16 inch thick slugs, called buttons. The button is mounted into a lathe with a diamond radius cutting tool and a concave radius is cut. The button is removed from the lathe mounted and polished. The button is now remounted so a convex (power) radius can be cut, and polished onto the surface. The lens is finished in a standard manner, as those skilled in the art are familar. The material may also be molded or cast into lenses.

With some though it is evident that permutations and combinations among the various polymers and copolymers presented here can be found. It is also apparent that changes and modifications may be made without departing from the invention in its broader aspects. The aim of the appended claims, therefore is to cover all such changes and modifications as fall within the true spirit and scope of the invention.

I claim:

1. A composition specially adapted for the manufacturing of contact lenses having increased oxygen permeability, consisting essentially of a copolymer of co-monomers consisting of about 10-90 parts by weight of a vinyl siloxane monomer copolymerized with 90-10 parts by weight of a vinyl acetate, the vinyl siloxane monomer being a polysiloxanylalkyl ester having as its structure:

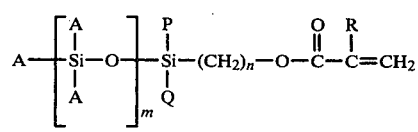

wherein P and Q are selected from the group consisting of $(C_1$-$C_7)$alkyl, phenyl, and Z groups; Z is

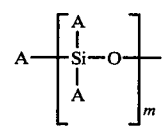

wherein A is selected from the group consisting of $(C_1$-$C_7)$ alkyl and phenyl groups; R is selected from the group consisting of methyl, ethyl, and butyl groups and hydrogen; m and n are integers of at least 1 and less than 8.

2. The composition of claim 1 wherein said copolymer is a copolymer of vinyl acetate and methacryloxypropyltri(trimethylsiloxy) silane.

3. The composition of claim 1 wherein said copolymer is a copolymer of methacryloxypropylpentamethyldisiloxane and vinyl acetate.

4. The composition of claim 1 wherein said copolymer is a copolymer of methacryloxypropyltris(pentamethyldisiloxyaryl) silane and vinyl acetate.

5. The composition of claim 1 wherein said copolymer is a copolymer of methyldi(trimethylsiloxy)silylpropylglycerol methacrylate and vinyl acetate.

6. The composition of claim 1 wherein said copolymer is a copolymer of bis(methacryloxybutyl)tetra methyldisiloxane and vinyl acetate.

7. A composition specially adapted for contact lenses having increased oxygen permeability, consisting essentially of a solid copolymer of the vinyl siloxane monomer of claim 1, vinyl acetate, and about 20–70 parts by weight of an ester of a $C_1$–$C_{20}$ monohydric alkanol and an acid selected from the group consisting of acrylic and methacrylic acids.

8. As a new article of manufacture, a contact lens having an increased oxygen permeability, consisting essentially of the compositions of claim 1 or 2.